United States Patent
Morito et al.

(10) Patent No.: US 6,658,135 B1
(45) Date of Patent: Dec. 2, 2003

(54) RECORDING DEVICE

(75) Inventors: Hajime Morito, Yokohama (JP); Naoko Iwami, Machida (JP); Hiroshi Yoshiura, Bunkyo-ku (JP); Chisato Konno, Inagi (JP); Yutaka Kurosu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/432,796

(22) Filed: Nov. 3, 1999

(30) Foreign Application Priority Data

Nov. 13, 1998 (JP) .......................... 10-323179

(51) Int. Cl.⁷ .................. G06K 9/00; G06K 15/00
(52) U.S. Cl. ...................... 382/100; 358/3.28
(58) Field of Search ............... 382/100, 232–236, 382/73, 305; 380/54, 28; 358/1.13, 3.28; 705/1; 707/101; 709/217; 713/126

(56) References Cited

U.S. PATENT DOCUMENTS

| | | | |
|---|---|---|---|
| 5,499,294 A | | 3/1996 | Friedman .................. 713/179 |
| 5,727,092 A | * | 3/1998 | Sandford et al. .......... 382/235 |
| 5,915,027 A | * | 6/1999 | Cox et al. .................. 380/54 |
| 5,960,081 A | * | 9/1999 | Vynne et al. ............... 348/461 |
| 6,122,403 A | * | 9/2000 | Rhoads ...................... 382/233 |
| 6,185,312 B1 | * | 2/2001 | Nakamura et al. ........ 283/113 |
| 6,233,347 B1 | * | 5/2001 | Chen et al. ................ 382/100 |
| 6,275,599 B1 | * | 8/2001 | Adler et al. ............... 382/100 |
| 6,285,775 B1 | * | 9/2001 | Wu et al. ................... 382/100 |
| 6,332,030 B1 | * | 12/2001 | Manjunath et al. ....... 382/100 |

FOREIGN PATENT DOCUMENTS

| | | |
|---|---|---|
| EP | 0840513 | 5/1998 |
| EP | 0845758 | 6/1998 |
| EP | 0854633 | 7/1998 |
| EP | 0859503 | 8/1998 |
| EP | 0860793 | 8/1998 |
| JP | 09200730 | 7/1997 |
| JP | 10248046 | 9/1998 |
| JP | 10290359 | 10/1998 |
| JP | 10308943 | 11/1998 |
| JP | 11308564 | 11/1999 |

OTHER PUBLICATIONS

Podilchuk et al., "Image–Adaptive Watermarking Using Visual Models", IEEE Journal on Selected Areas in Communications, vol. 16, No. 4, May 1998, pp. 525–539.*

Dittman et al., "Content–based Dlgital Signature for Motion Pictures Authentication and Content–Fragile Watermarking", IEEE 1999, pp. 209–213.*

* cited by examiner

*Primary Examiner*—Jayanti K. Patel
(74) *Attorney, Agent, or Firm*—Antonelli, Terry, Stout & Kraus, LLP

(57) ABSTRACT

A recording device which is capable of preventing alteration of a generated digital picture data and suitable for improving the reliability of the digital picture data as an evidence. The recording device includes a related information embedding unit for embedding a related information on the digital picture data stored in a related information storing unit in the digital picture data obtained by a picture receiving unit by means of the digital watermarking technique, a digital signature generating unit for generating a digital signature of the digital picture data in which the related information has been embedded, and a recording unit for adding the digital signature to the digital picture data in which the related information has been embedded and storing it in a memory unit.

2 Claims, 11 Drawing Sheets

0 : ORDINARY MODE
1 : PICTURE FOR EVIDENCE MODE

0 : ORDINARY MODE
1 : PICTURE FOR EVIDENCE MODE

0 : NO ALTERNATION
1 : ALTERNATION

RECORDING DEVICE

This invention relates to U.S. patent application Ser. No. 09/365,837, filed on Aug. 3, 1999 (Priority: Japan Patent Application Number 10-220104), the disclosures of which are incorporated herein by reference.

BACKGROUND OF THE INVENTION

This invention relates to a recording device for picking up an image and converting the image to a digital picture data, and more particularly relates to a technique suitable for preventing the alteration of a digital picture data and improvement of the reliability of the digital image data as an evidence.

Heretofore, digital cameras and other recording devices in which an optical image formed by use of a lens is converted to an electric signal by use of an image pick-up element such as CCD (Charge Coupled Device) and the obtained picture data is recorded digitally have been known. Recently, with the improvement in performance of the image pick-up element, it is possible to obtain the picture quality equivalent to that of silver halide photography, therefore it will be expected that the digital camera is employed for image pick-up for various certification and evidence instead of the ordinary camera.

SUMMARY OF THE INVENTION

The digital picture data is characterized in that it is easily edited and duplicated by use of a computer. In the case that a digital camera is used for image pick-up for various certification or evidences, such alteration and evidence can be altered more elaborately in comparison with those derived from an ordinary camera.

For example, it could happen that a digital picture data on another person obtained by use of a digital camera is duplicated without consent and is used for various certification or evidence, otherwise an digital picture data obtained by use of a digital camera which is edited to change the original picture and is used for various certification or evidence. In this case, it is not easy to detect the alteration in comparison with the silver halide photography obtained by an ordinary camera.

The present invention was accomplished to solve the above-mentioned problem, it is the object of the present invention to provide a digital camera and another recording device which are suitable for preventing the alteration of an obtained digital picture data and improvement of the reliability of a digital picture data as an evidence.

To solve the above-mentioned problem, the first aspect of the present invention provides a recording device for picking up an image and converting the image to digital picture data comprising; a digital signature means for generating a digital signature of the digital picture data, and a storing means for adding the digital signature to the digital picture data and storing the digital picture data having the added digital signature in a storage medium.

An authentication means for authenticating the digital picture data by use of the digital signature added to the digital picture data may be additionally provided.

As the digital signature technique used for the digital signature means and the authentication means of the present aspect, for example, a technique described in T. Elgamal, "A Public Key Cryptosystem and a Signature Scheme Based on Discrete Logarithms" (IEEE Trans. on Inform. Theory, Vol. IT31, No. 4, pp 469–472, 1985) has been known. In detail, the digital signature means evaluates the digital picture data by use of hash function, which is one-way function, the evaluation result namely a hash value is encrypted by use of a private key (signature key) in accordance with the public key cryptography system to thereby generate a digital signature of the digital picture data. On the other hand, the authentication means obtains a hash value by decrypting the digital signature added to the digital picture data by use of the public key (verification key) which is the one component of the paired private key, and compares this hash value with the hash value obtained by evaluating the digital picture data by use of the hash function. In the case that both hash values are identical, the digital picture data is regarded as a digital picture data which has not been subjected to alteration after generation of the digital signature, and authenticated.

According to the present aspect, because the digital picture data, which has been obtained by picking up an image, having the added digital signature of the data is stored in a storage medium, alteration which is added to the data after generation of the digital signature is detected by authentication by use of the digital signature. Because a digital signature is generated in the recording device during image picking up, the fraudulence such as alteration of the digital picture data is detected easily in the situation that the digital picture data is used for various certification and evidence.

The second aspect of the present invention provides a recording device for picking up an image and converting the image to digital picture data comprising; a digital watermarking means for embedding a related information on the digital picture data in the digital picture data by means of the digital watermarking technique, and a storage means for storing the digital picture data in which the related information has been embedded.

Wherein, a related information getting means for extracting the related information embedded in the digital picture data by means of the digital watermarking technique may be additionally provided. The term "digital watermarking technique" denotes a technique in which a predetermined information is embedded in a digital picture data according to a predetermined rule, for example, the luminance information on the digital picture data is changed so that the predetermined information can not be extracted from the digital picture data at least without using the predetermined rule. In one technique the original digital picture data (the digital picture data before embedding of the predetermined information) is referred, and in the other technique the original digital picture data is not referred, when the predetermined information is extracted from the digital picture data. The technique in which the related information can be extracted from the digital picture data without referring to the original data is preferably used for the related information getting means of the present aspect. As this type of technique, for example, a technique described in S. Shimizu et al., "Data Hiding based on neighbor pixels statistics—reliability—" (In Proc. of IPSJ 56th annual conference, 1998) has been known.

According to the present aspect, because the digital picture data obtained by picking up an image having the embedded related information on the data, for example, the copyright information such as pick-up date, photographer and place where the image is picked up, is stored, the related information is extracted from the digital picture data and the content can be confirmed. Because the related information is embedded in the recording device during image pick-up, the recording device is used for image picking up for various certification and evidence to improve the reliability of the digital picture data as an evidence.

In the present aspect, the digital watermarking means which divides the digital picture data into a plurality of areas, embeds the related information on the digital picture data in at least one area from among the plurality of divided areas, and integrates the plurality of divided areas including the area in which the related information has been embedded to generate the digital picture data in which the related information has been embedded may be used.

By structuring the digital watermarking means as described herein above, the related information is embedded in an arbitrary area of the digital picture data divided into the plurality of areas, therefore the work area and the load on the CPU used for embedding the related information is reduced in comparison with the case in which the related information is embedded in the whole digital picture data. This effect is particularly advantageous for the recording device because the small size and light weight are desirable.

In the case that the deterioration of the picture quality of the area is apprehensive as the result that all the related information is embedded concentratedly in the area, the process may be modified as described herein under. In detail, the related information is divided into a plurality of segments so that each segment corresponds to the plurality of respective areas. The plurality of corresponding respective segments are embedded in the plurality of respective areas successively, and then the plurality of areas in which the corresponding segments of the related information has been embedded are integrated to generate the digital picture data having the embedded related information.

The third aspect of the present invention provides a recording device for picking up an image and converting the image to digital picture data comprising;

a digital watermarking means for embedding an related information on the digital picture data in the digital picture data by means of the digital watermarking technique, a digital signature means for generating a digital signature of the digital picture data in which the related information has been embedded, and a storage means for adding the digital signature to the digital picture data in which the related information has been embedded and storing the resultant digital picture data in a storage medium.

Wherein, the recording device may additionally comprise an authentication means for authenticating the digital picture data in which the related information has been embedded by use of the digital signature added to the digital picture data in which the related information has been embedded, and a related information getting means for extracting the related information embedded in the digital picture data by means of digital watermarking technique.

According to the present aspect, because the related information on the data is embedded in the digital picture data obtained by picking up an image and furthermore the digital signature of the data is added to the digital picture data having the embedded related information and then it is stored in a storage medium, alteration added after generation of the digital signature is detected by authentication by use of the digital signature, and the related information is extracted from the data to confirm the content. Accordingly, the recording device is used for picking up an image for various certification and evidence, as the result the fraudulence such as alteration of the digital picture data is detected and the reliability of the digital picture data as an evidence is improved.

In the present aspect, the recording device may additionally comprise a compressing means for compressing the digital picture data in which the related information has been embedded, the digital signature means generates a digital signature of the compressed data, and the storage means adds the digital signature to the compressed data and stores the resultant compressed data in a storage medium.

Otherwise, the recording device may additionally comprise a compressing means for compressing the digital picture data, the digital watermarking means embeds the related information on the digital picture data in the digital picture data by means of the digital watermarking technique, the digital signature means generates a digital signature of the compressed data in which the related information has been embedded, and the storage means adds the digital signature on the compressed data in which the related information has been embedded, and stores the resultant compressed data in a storage medium.

By structuring as described herein above, the amount of information to be stored in the storage medium is reduced in both cases. In the former case the related information is embedded in the digital picture data and then the data is compressed, on the other hand in the latter case the digital picture data is compressed and then the related information is embedded, as the result, the former case is more advantageous than the latter case in that the adverse effect of the related information on the original digital picture data is less severe.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

The first embodiment of the present invention will be described in detail hereinafter.

Figure 1:
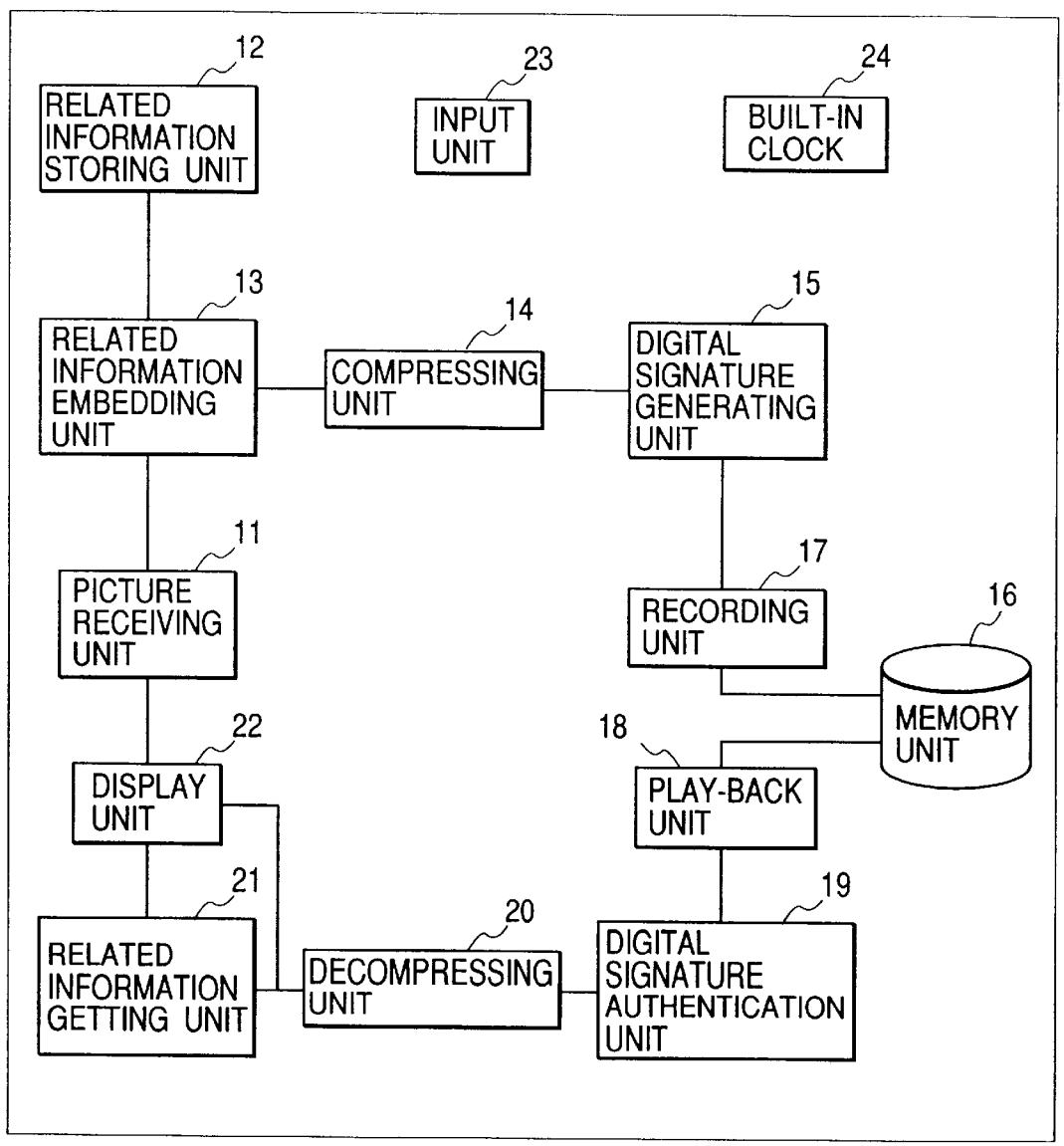
FIG. 1 is a block diagram for illustrating the functional structure of a digital camera to which the first embodiment of the present invention is applied.

FIG. 1 is a block diagram for illustrating the functional structure of a digital camera to which the first embodiment of the present invention is applied.

In FIG. 1, a picture receiving unit 11 converts an optical image formed by a lens to an electric signal by use of an image pick-up element such as a CCD (Charge Coupled Device) or MOS (Metal-Oxide Semiconductor) and converts the electric signal to a digital picture data.

The related information storing unit 12 stores the related information to a digital picture data obtained by use of the picture receiving unit 11, for example, information such as date of image pick-up, the person who picks up the image, and the place where the image is picked up. The person who was accepted previously by an operator through the input unit 23 may be registered as the information on the person who picked up the image. The information on image pick-up date may be acquired from the built-in clock 24. The information on image pick-up place may be accepted from an operator though the input unit 23 every time when an image is picked up, otherwise a present location calculation unit for calculating the present location by means of GPS technology is provided and a present location calculated by the present location calculation unit when the image is picked up may be regarded as the information on image pick-up place.

The related information embedding unit 13 embeds the related information on the digital picture data stored in the related information storing unit 12 in the digital picture data obtained by the picture receiving unit 11 by applying digital watermarking technique. The digital watermarking technique is a technique for embedding a desired information in a digital picture data according to a predetermined rule, for example, by changing the luminance information on the above-mentioned digital picture data so that the above-mentioned desired information can not be extracted from the above-mentioned digital picture data at least without using the above-mentioned predetermined rule. In one technique, the original digital picture data (the digital picture data before the above-mentioned desired information is embedded) is referred, and in the other technique, the original digital picture data is not referred, when the above-mentioned desired information is extracted from the above-mentioned digital picture data. In the present embodiment, the latter technique is used. For example, a technique described in S. Shimizu, et al., "Data Hiding based on neighbor pixels statistics—reliability—" (In Proc. of IPSJ 56th annual conference, pp.3–39-pp.3–40, 1998) has been known as the technique of this type.

A compressing unit 14 compresses a digital picture data in which the related information is embedded by the related information embedding unit 13 according to, for example, JPEG (Joint Photographic Coding Experts Group) system defined by "ISO international Standard 10918 Part 1".

A digital signature generating unit 15 generates a digital signature to the digital picture data compressed by the compressing unit 14 in which the related information has been embedded. For example, a technique described in T. Elgamal, "A Public Key Cryptosystem and a Signature Scheme Based on Descrete Logarithms" (IEEE Trans. on Inform. Theory, Vol. IT 31, No.4, pp 469–472, 1985) has been known as a digital signature technique. In detail, the data compressed by the compressing unit 14 is evaluated by use of hash function that is one-way function, the evaluation result that is a hash value is encrypted by use of a private key (signing key) according to the public key cryptography system to generates a digital signature.

A memory unit 16 comprises a detachable storage medium such as a flash memory.

Figure 2:
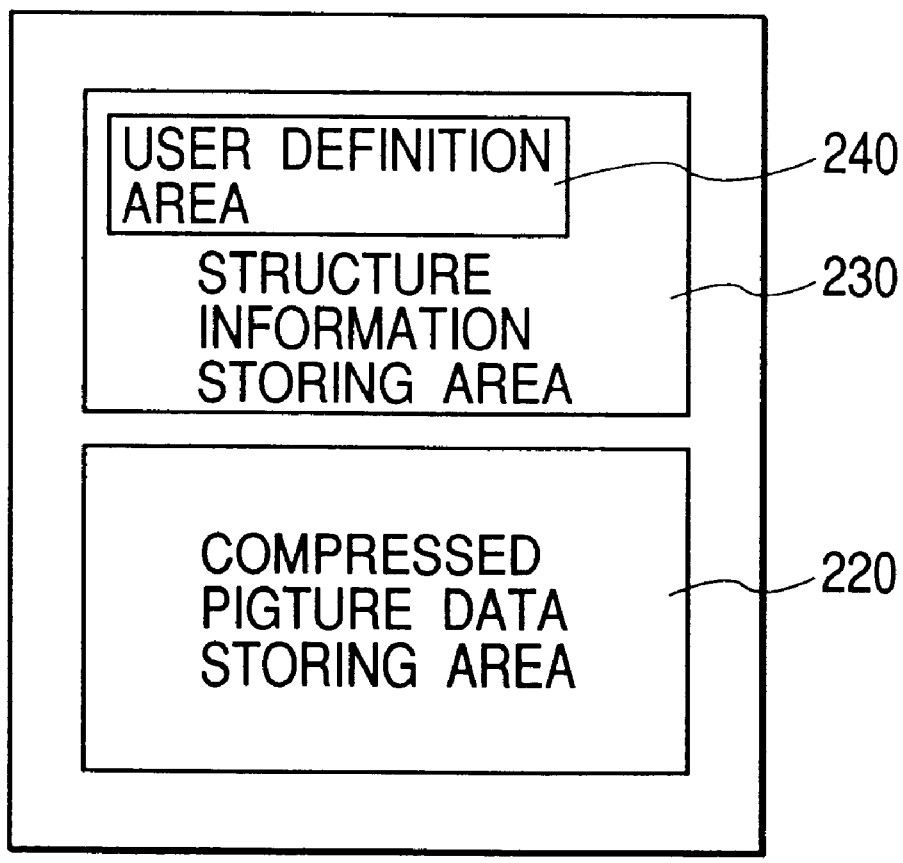
FIG. 2 is a diagram for illustrating a data structure recorded in a storage medium incorporated in a memory unit 16 in the case that JPEG system is used for compression in the compressing unit 14 shown in FIG. 1.

A recording unit 17 records the digital picture data compressed by the compressing unit 14, in which the related information has been embedded and to which the digital signature generated by the digital signature generating unit 15 is added, in a storage medium attached to the memory unit 16. FIG. 2 is a diagram for illustrating a data structure recorded in the storage medium attached to a memory unit 16 in the case that JPEG system is used for compression in the compressing unit 14. As shown in FIG. 2, the data file compressed according to JPEG system comprises a compressed picture data storing area 220 for storing the compressed picture data and a structure information storing area 230 for storing the structure information on the compressed picture data stored in the compressed picture data storing area 220 such as the whole size of compressed data files, the size of the compressed picture data storing area 220, and the error correction information. In the structure information storing area 230, a user definition area (Application Data Segment) 240, which is an extended area definable by a user, is provided in the structure information storage area 230.

The recording unit 17 records the data compressed by the compressing unit 14 to which the digital signature has been added by storing the digital signature generated by the digital signature generating unit 15 in the user definition area 240.

A play-back unit 18 reads out the compressed picture data recorded in the storage medium attached to the memory unit 16 and the digital signature added to the above-mentioned data.

A digital signature authentication unit 19 authenticates the compressed picture data to which the above-mentioned digital signature has been added by use of the digital signature read out by the play-back unit 18. The digital signature authentication unit 19 is paired with the digital signature generating unit 15, in detail, the digital signature authentication unit 19 decrypts the digital signature by use of the public key (authentication key), which is paired with the private key used for encrypting the hash value in the digital signature generating unit 15, and decrypts the hash value. Furthermore, the digital signature authentication unit 19 evaluates the compressed picture data to which the above-mentioned digital signature has been added with reference to the hash function used for generating the hash value in the digital signature generating unit 15 to generate the evaluation result namely a hash value. The decrypted hash value is compared with the generated hash value, and if both values are identical, the compressed picture data is regarded as a compressed picture data which has not been altered after the digital signature of this data was generated, and is authenticated.

A decompressing unit 20 is paired with the compressing unit 14, decompresses the compressed picture data authenticated by the digital signature authentication unit 19 according to decompression system corresponding to the compression system used in the compressing unit 14, and decrypts the digital picture data in which the related information has been embedded.

A related information getting unit 21 extracts the related information from the digital picture data which has been decompressed by the decompressing unit 20 having the embedded related information. The related information getting unit 21 is paired with the related information embedding unit 13, and extracts the related information from the digital picture data according to the predetermined rule used when the related information was embedded in the digital picture data by the related information embedding unit 13. As described herein above, in the present embodiment, a technique in which the related information is extracted from the digital picture data without reference to the original digital picture data (the digital picture data before the related information is embedded) is applied.

A display unit 22 comprises, for example, a liquid crystal panel, displays the digital picture data obtained by the picture receiving unit 11, the digital picture data decompressed by the decompressing unit 20, or the related information extracted by the related information getting unit 21.

Next, the hardware structure of a digital camera to which the present embodiment is applied is described.

Figure 3:
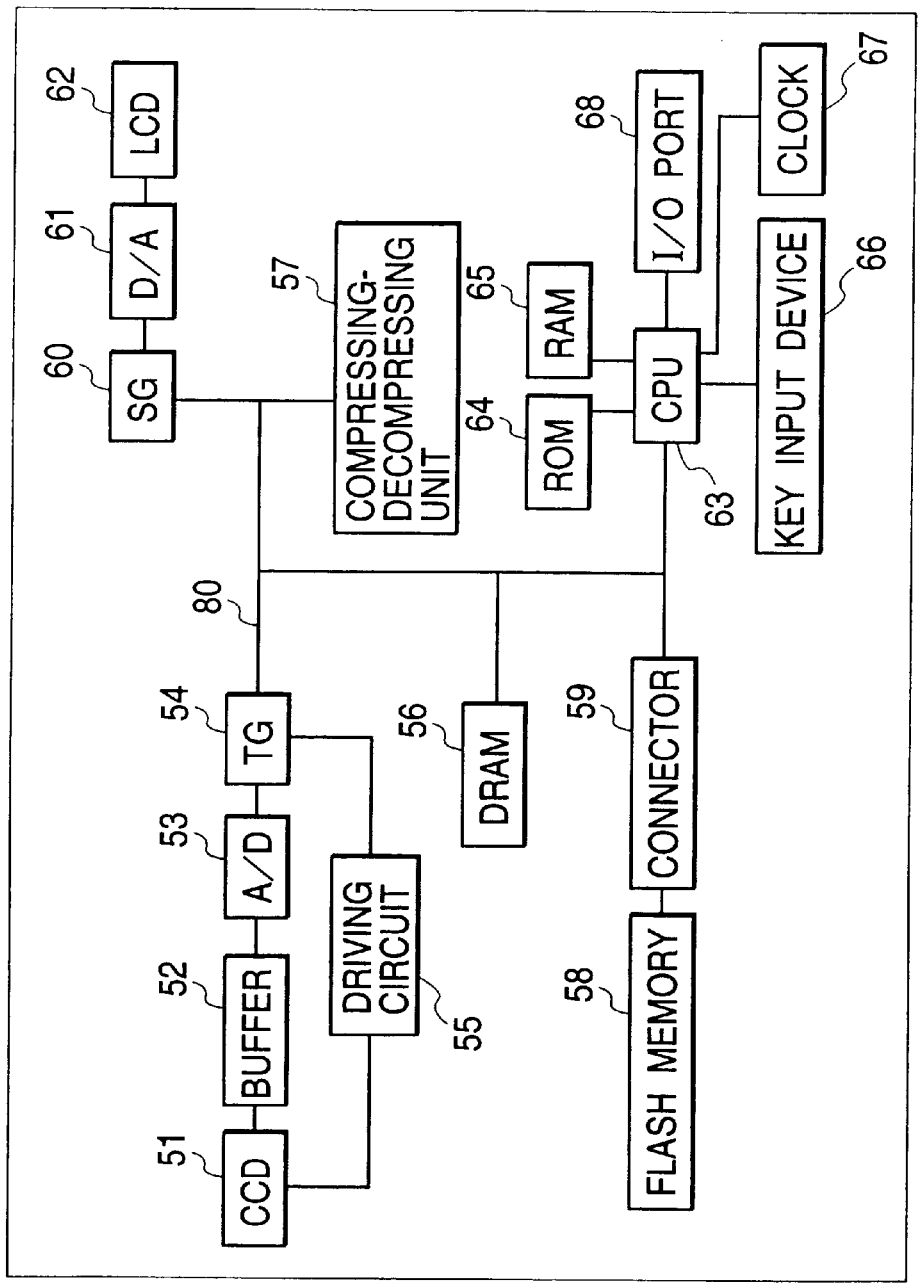
FIG. 3 is a block diagram for illustrating one example of the hardware structure of the digital camera shown in FIG. 1.

FIG. 3 is a block diagram for illustrating one example of the hardware structure of the digital camera shown in FIG. 1.

In FIG. 3, a CCD 51, buffer 52, A/D converter 53, timing generator (TG) 54, and driving circuit 55 are components of the picture receiving unit 11 shown in FIG. 1. In detail, an optical image obtained by the lens is converted to an electric signal by the CCD 51, subjected to amplification or the like through the buffer 52, converted to a digital picture data by the A/D converter 53, and supplied to the timing generator 54. The timing generator 54 generates a timing signal to control the driving circuit 55 which is served for driving the CCD 51 and sends out the digital picture data to a data bus 80 according to the timing signal.

A flash memory 58 is structured so as to be detachable to the connector 59. The flash memory 58 and connector 59 are components of the memory unit 16 shown in FIG. 1.

A DRAM (Dynamic RAM) 56 temporarily stores the digital picture data sent out to the data bus 80 from the timing generator 54, the data sent out to the data bus 80 from the flash memory 58 through the connector 59, or the data sent out to the data bus 80 from a compressing-decompressing circuit 57. The digital picture data is separated into the luminance signal and the chrominance signal by calculation using the CPU 63 and stored in the DRAM 56.

The compressing-decompressing circuit 57 is a component of the compressing unit 14 and the decompressing unit 20 shown in FIG. 1. In detail, the digital picture data stored in the DRAM 56 is compressed and the compressed digital picture data is decompressed.

A video signal generator (SG) 60, D/A converter 61, and liquid crystal display (LCD) 62 are components of the display unit 22 shown in FIG. 1. In detail, the digital picture data on the data bus is taken in the video signal generator 60 in response to the indication given by a CPU 63, and added with a sync signal therein to be converted to a digital video signal. The digital video signal is converted by the D/A converter 61 to an analog signal, and the analog signal is supplied to the liquid crystal display 62.

A key input device 66 functions as the input unit 23 shown in FIG. 1, and comprises a switch for accepting the operation mode (image pick-up, playback) and various set values and a shutter button for accepting recording indication.

A clock 67 functions as the built-in clock 24 shown in FIG. 1 and generates the time information. An I/O port 68 functions as an interface for input/output of the video signal converted to a serial signal.

A ROM 64 stores a program for controlling components of the digital camera integrally, a program for embedding/extracting (digital watermarking technique) the related information on/from the digital picture data, and a program for generating and authenticating the digital signature (digital signature technique). Furthermore, the ROM 64 stores the private key and public key encrypted according to the public key cryptography system used for generating and authenticating the digital signature. The ROM 64 may be provided fixedly to the digital camera or may be provided detachably to the digital camera, for example, may be a memory card.

The CPU 63 performs various programs stored in the ROM 64 to control respective components of the digital camera integrally. Furthermore the CPU 63 activates the related information embedding unit 13, the related information getting unit 21, the digital signature generating unit 15, the digital signature authentication unit 19, the recording unit 17, and the play-back unit 18 to perform processes.

The RAM 65 functions as a work area of the CPU 63 and is a component of the related information storing unit 12 shown in FIG. 1.

First, the image picking up operation of the digital camera to which the present embodiment is applied is described.

Figure 4:
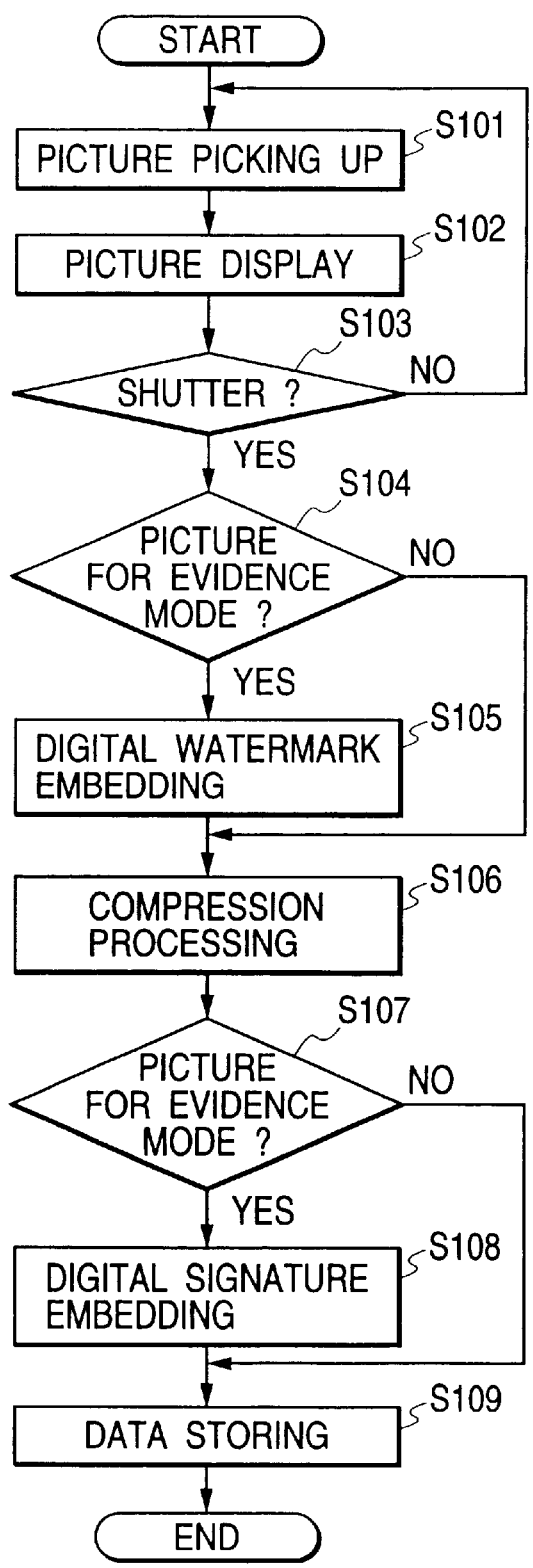
FIG. 4 is a flow chart for describing the image picking up operation of the digital camera shown in FIG. 1.

FIG. 4 is a flow chart for describing the image picking up operation of the digital camera shown in FIG. 1.

This flow is performed in the case that an operator accepted by the input unit 23 indicates the image pick-up mode to be selected as the operation mode.

First, the picture receiving unit 11 converts an optical image formed by the lens to an electric signal, and converts the electric signal to a digital picture data, and sends it to the display unit 22 (step S101). The display unit 22 displays a picture in accordance with the received digital picture data (step S102).

Next, the picture receiving unit 11 determines whether recording indication of the digital picture data has been entered by use of the input unit 23, namely whether a shutter button has been pushed (step S103), and if the shutter button has been pushed, then the sequence proceeds to step S104, on the other hand if the shutter button has not been pushed, then the sequence returns to step S101.

Figure 5A:
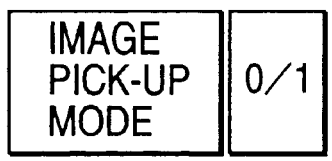
FIG. 5(a) is a diagram for describing an image pick-up mode flag stored in a RAM 65 shown FIG. 3.

In step S104, the related information embedding unit 13 determines whether the image pick-up mode selected by the operator by use of the input unit 23 is the picture for evidence mode for embedding the related information in the digital picture data and adding a digital signature. The determination is realized by storing a flag for indicating whether the selected image pick-up mode is the picture for evidence mode or the ordinary image pick-up mode as shown exemplarily in FIG. 5 (a) on the predetermined area of the RAM 65 shown in FIG. 3 when the operator selects the image pick-up mode by use of input unit 23.

In step S104, if the selected image pick-up mode is determined to be the picture for evidence mode, then the digital picture data is obtained from the picture receiving unit 11, and the related information stored in the related information storing unit 12 is embedded by applying the digital watermarking technique (step S105). The digital picture data having the embedded related information is supplied to the compressing unit 14. On the other hand, if the selected image pick-up mode is determined not to be the picture for evidence mode, then the digital picture data acquired from the picture receiving unit 11 is supplied to the compressing unit 14 without embedding the related information.

Next, the compressing unit 14 compresses the digital picture data received from the related information embedding unit 13 or the digital picture data having the embedded related information according to the predetermined compression system (step S106), and supplies the compression result namely the compressed picture data to the digital signature generating unit 15.

Next, the digital signature generating unit 15 determines whether the image pick-up mode selected by the operator by use of the input unit 23 is the picture for evidence mode (step S107). If the selected image pick-up mode is determined to be the picture for evidence mode, then a digital signature of the compressed picture data received from the compressing unit 14 is generated (step S108) and the generated digital signature is supplied to the recording unit 17 together with the compressed picture data. On the other hand, if the selected image pick-up mode is determined not to be the picture for evidence mode, then the compressed picture data received from the compressing unit 14 is supplied to the recording unit 17 without generation of a digital signature.

Next, the recording unit 109 stores the compressed picture data received from the digital signature generating unit 15 in the storage medium attached to the memory unit 16 (step S109). At that time, if the digital signature of the data is received from the digital signature generating unit 15 together with the compressed picture data, the data to which the digital signature is added is stored.

As the result of the above-mentioned process, in the case that the picture for evidence mode is selected as the image pick-up mode, the related information on the data is embedded in the digital picture data obtained by image pick-up and compressed, and the digital signature of the compressed picture data is generated. The compressed picture data is recorded in the storage medium together with the digital signature.

Figure 6:
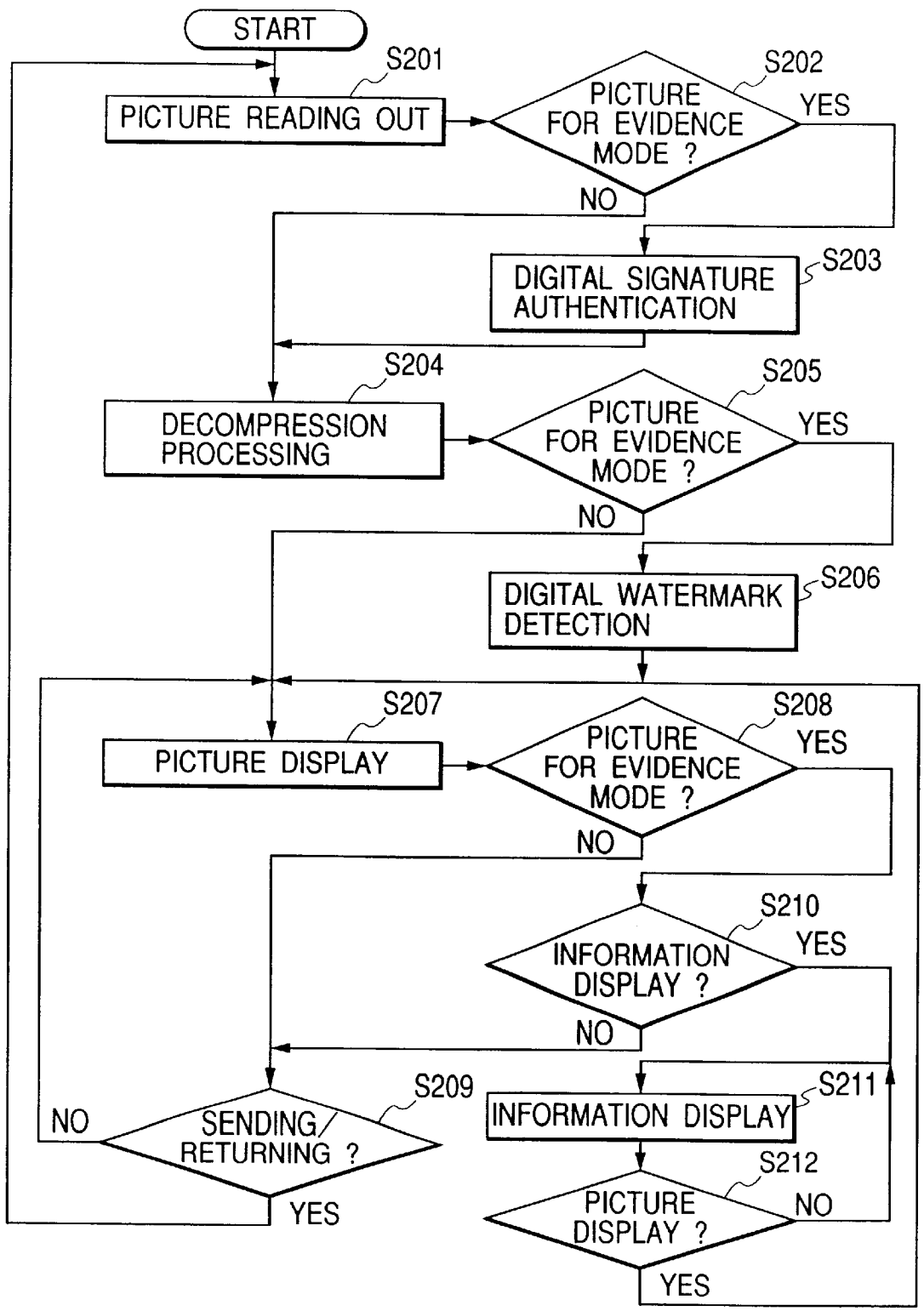
FIG. 6 is a flow chart for describing the picture image playback operation of the digital camera shown in FIG. 1.

Next, the image playback operation of the digital camera to which the present embodiment is applied is described. FIG. 6 is a flow chart for describing the image playback operation of the digital camera shown in FIG. 1. This flow is performed if the operator accepted by the input unit 23 indicates the playback mode to be selected as the operation mode.

First, the play-back unit 18 reads out the compressed picture data (the data recorded in the storage medium by means of the flow shown in FIG. 4) from the storage medium attached to the memory unit 16 (step S201), and supplies it to the digital signature authentication unit 19. If a digital signature is added to the compressed picture data, the digital signature is also read out and supplied to the digital signature authentication unit 19.

Next, the digital signature authentication unit 19 determines whether the compressed picture data is a picture picked up in the picture for evidence mode by checking whether a digital signature is added to the compressed picture data received from the play-back unit 18 (step S202). If the picture is a picture picked up in the picture for evidence mode, a flag "1" for indicating that this picture is a picture picked up in the picture for evidence mode is stored in the predetermined area of the RAM 65 or the like shown in FIG. 3, and the sequence proceeds to step S203. On the other hand, if the picture is not a picture picked up in the picture for evidence mode, a flag "0" for indicating that this picture is a picture picked up in the ordinary mode as shown exemplarily in FIG. 5(*b*) is stored in the predetermined area of the RAM 65 or the like shown in FIG. 3, and the sequence proceeds to step S204.

Figure 5B:
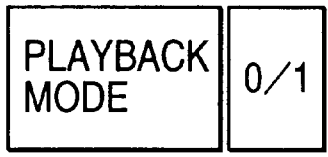
FIG. 5(b) is a diagram for describing a playback mode flag stored in a RAM 65 shown FIG. 3.
Figure 5C:
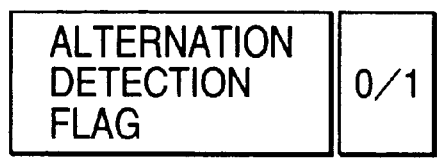
FIG. 5(c) is a diagram for describing an alternation detection mode flag stored in a RAM 65 shown FIG. 3.

In step S203, the digital signature authentication unit 19 authenticates the compressed picture data by use of the digital signature added to the compressed picture data and the authentication result is stored. A flag for indicating whether the compressed picture data has been altered as shown in exemplarily in FIG. 5(c) is stored in the predetermined area of the RAM 65 shown in FIG. 3.

In step S204, the decompressing unit 20 receives the compressed picture data from the digital signature authentication unit 19 and decompresses it to obtain the digital picture data.

Next, the related information getting unit 21 checks the flag generated in step S202, and determines whether the digital picture data decompressed by the decompressing unit 20 is a digital picture data picked up in the picture for evidence mode (step S205). If the digital picture data is a digital picture data picked up in the picture for evidence mode, the sequence proceeds to step S206 as shown in the flow in FIG. 4, and the related information is extracted from the digital picture data by means of the digital watermarking technique because the related information is embedded in the digital picture data. The digital picture data is supplied to the display unit 22, and displayed on the display screen (step S207). On the other hand, if the digital picture data is not a digital picture data picked up in the picture for evidence mode, the digital picture data is supplied directly to the display unit 22, and displayed on the display screen (step S207).

Next, the display unit 22 checks the flag generated in step S202 to determine whether the digital picture data which is being displayed on the display screen is a digital picture data picked up in the picture for evidence mode (step S208). If the digital picture data is not a digital picture data picked up in the picture for evidence mode, the sequence proceeds to step S209, and whether the operator indicates sending/returning shift of the picture by use of the input unit 23 is determined. If the operator indicates sending/returning shift of the picture, the sequence returns to step S201 to read out the compressed picture data specified by the indication from the storage medium of the memory unit 16. On the other hand, if sending/returning shift indication of the picture is not entered, the sequence returns to step S207.

In step S208, if the digital picture data which is being displayed on the display screen is determined to be a digital picture data picked up in the picture for evidence mode, then the sequence proceeds to step S210, and whether the operator enters display indication of the related information by use of the input unit 23 is determined. If the operator does not enter display indication, then the sequence proceeds to step S209. On the other hand, if display indication of the related information is entered, then the related information, which is being displayed, of the digital picture data extracted by the related information getting unit 21 is acquired, and the display content is switched from the digital picture data to the related information (step S211). At that time, the flag generated in step S203 is checked, and the authentication result (YES/NO of alteration) of the digital signature is also displayed. Then, the sequence proceeds to step S212.

In step S212, whether the operator has entered display indication of the picture by use of the input unit 23 is determined, if the indication has been entered, then the sequence proceeds to step S207, the display content is switched from the related information to a picture in accordance with the digital picture data.

According to the present embodiment, the related information on the data is embedded in the digital picture data obtained by picking up an image and furthermore a digital signature of the data is added to the digital picture data having the embedded related information, and the resultant digital picture data is stored in the storage medium, and by authenticating the digital picture data by use of the digital signature, alteration added to the data after generation of the digital signature is detected and the related information is extracted from the data to confirm the content. Because the related information is embedded and the digital signature is generated in the digital camera during picking up of the image, in the case that the digital camera is used for picking up of an image for various certification and evidence, the fraudulence such as alteration of the digital picture data is detected and the reliability as an evidence is improved.

In the present embodiment, the digital picture data having the embedded related information is compressed, and the digital signature is generated for the compressed picture data. Such process allows the amount of information which is to be stored in the storage medium to be reduced.

In the present embodiment, the process in which the related information embedding unit 13 embeds the related information in the digital picture data received from the picture receiving unit 11 and then the compressing unit 14 compresses the data is described, however otherwise a process in which the compressing unit 14 compresses the digital picture data received from the picture receiving unit 11 and then the related information embedding unit 13 embeds the related information on the above-mentioned digital picture data in the compressed picture data may be employed. In this case, the related information getting unit 21 extracts the related information from the compressed picture data having the embedded related information and then the decompressing unit 20 decompresses it for playing back the picture.

Also in this case, the amount of information to be stored in the storage medium can be reduced in the same degree as in the present embodiment. However, in this case, because the related information is embedded in the compressed picture data of the digital picture data, the influence on the digital picture data is severer in comparison with that in the present embodiment.

Figure 7:
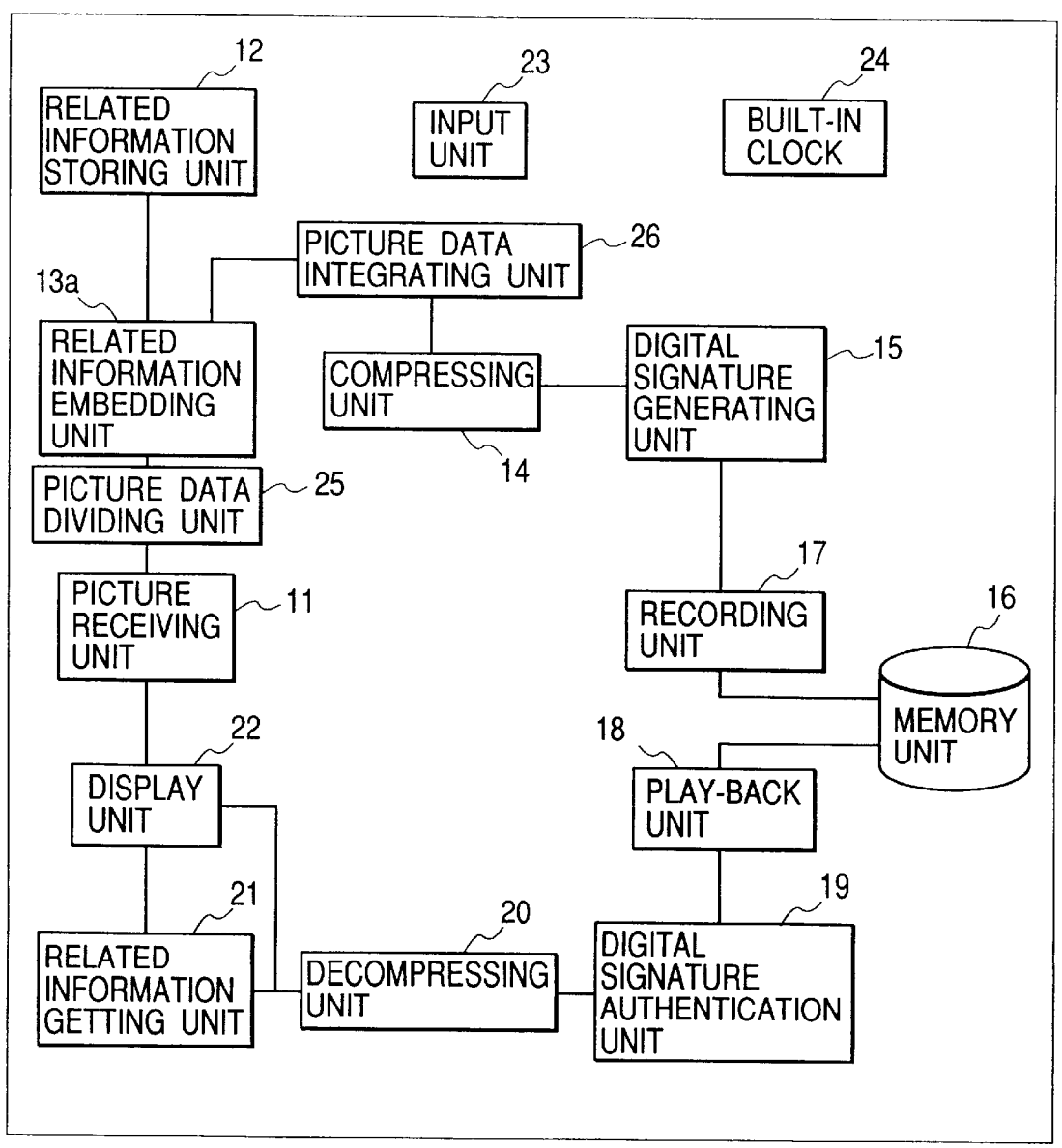
FIG. 7 is a block diagram for illustrating the functional structure of a digital camera to which the second embodiment of the present invention is applied.

Next, the second embodiment of the present invention will be described. FIG. 7 is a block diagram for illustrating the functional structure of a digital camera to which the second embodiment of the present invention is applied.

As shown in FIG. 7, the digital camera of the present embodiment is different from the digital camera in accordance with the first embodiment shown in FIG. 1 in that a related information embedding unit 13*a* is used instead of the related information embedding unit 13 and a picture data dividing unit 25 and a picture data integrating unit 26 are provided additionally. Other components are the same as those used in the first embodiment.

The picture data dividing unit 25 divides a digital picture data received from a picture receiving unit 11 into a plurality of areas. For example, in the case of the received digital picture data comprising 1280×960 pixels, the data is divided into 6 areas, each area comprises 1280×160 pixels. The divided digital picture data is supplied to the related information embedding unit 13*a*.

The related information embedding unit 13*a* acquires the related information on the divided digital picture data received from the picture data dividing unit 25 from the related information storing unit 12, and embeds the related information in an arbitrary area of the divided digital picture data by means of the digital watermarking technique. The data of the digital picture data on all the areas including the area where the related information is embedded is supplied to the picture data integrating unit 26.

The picture data integrating unit 26 integrates the data supplied from the related information embedding unit 13*a* to restore the digital picture data. Thereby, the digital picture data having the embedded related information is generated, and supplied to the compressing unit 14.

The above-mentioned functional structure block has stored programs for realizing these functions in a ROM 64 in FIG. 3, and a CPU 63 performs these programs to realize these functions.

According to the present embodiment, because the related information is embedded in an arbitrary area of the digital picture data divided into a plurality of areas, the smaller work area of memory and the smaller load on the CPU are sufficient for embedding the related information in comparison with the case in which the related information is embedded in the whole area of the digital picture data. In other words, the smaller capacity of the RAM 65 and the CPU 63 is sufficient in FIG. 3. This effect is particularly advantageous for the digital camera because the small size and light weight are desirable for the digital camera.

In the present embodiment, the related information is embedded in an arbitrary area of the digital picture data divided into a plurality of areas, however, in the case that the deterioration of the picture quality of the area is apprehensive as the result that all the related information is embedded concentratedly in the area, the process may be modified as described herein under.

In detail, the related information embedding unit 13*a* divides the related information into the same number of segments as the number of digital picture data areas divided by the picture data dividing unit 25, and the respective divided related information segments are allocated so as to correspond to the respective areas of the digital picture data divided into a plurality of areas. The corresponding segments of the related information divided into a plurality of segments are embedded in the respective areas of the digital picture data divided into a plurality of areas. Thereafter, the picture data integrating unit 26 integrates the plurality of areas in which corresponding segments of the related information are embedded to generate the digital picture data having the embedded related information.

Next, the third embodiment of the present invention will be described.

Figure 8:
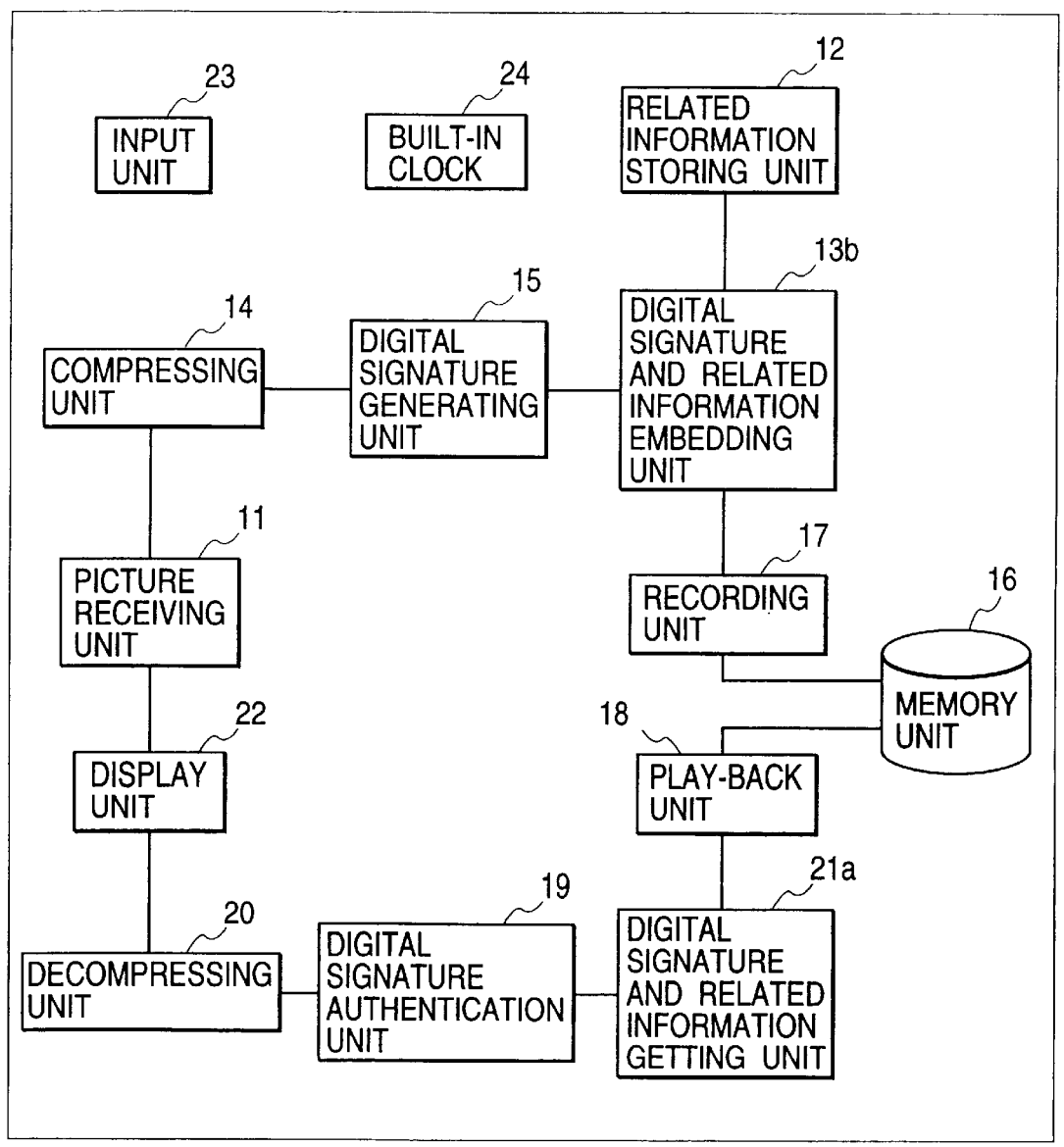
FIG. 8 is a block diagram for illustrating the functional structure of a digital camera to which the third embodiment of the present invention is applied.

FIG. 8 is a block diagram for illustrating the functional structure of a digital camera to which the third embodiment of the present invention is applied.

As shown in FIG. 8, the digital camera in accordance with the third embodiment is different from the digital camera in accordance with the first embodiment shown in FIG. 1 in that a digital signature and related information embedding unit 13*b* and a digital signature and related information getting unit 21*a* are provided instead of the related information embedding unit 13 and the related information getting unit 21. other components are the same as those used in the first embodiment.

The digital signature and related information embedding unit 13*b* embeds the digital signature generated by the digital signature generating unit 15 for the compressed picture data generated by the compressing unit 14 and the related information, which is stored in the related information storing unit 12, of the digital picture data from which the compressed picture data will be derived, on the compressed picture data by means of the digital watermarking technique.

The digital signature and related information getting unit 21a extracts the digital signature and the related information on the compressed picture data embedded in the compressed picture data by means of the digital watermarking technique.

It is required that the digital signature and related information embedding unit 13b embeds the digital signature and the related information so as that the digital signature and related information getting unit 21a can remove these information thoroughly from the compressed picture data. For example, the digital signature and the related information are embedded so as to be inserted at a plurality of predetermined positions of the compressed picture data according to a predetermined rule. As the result, the digital signature and related information getting unit 21a removes the information at the plurality of predetermined positions of the compressed picture data according to the predetermined rule so that the digital signature and the related information is removed thoroughly from the compressed picture data.

The above-mentioned functional block has a program for realizing these functions stored in the ROM 64 shown in FIG. 3, and the CPU 63 performs the program to realize these functions.

Next, the operation of the digital camera to which the present embodiment is applied will be described herein under.

First, the operation of the digital camera to which the present embodiment is applied for picking up an image is described.

Figure 9:
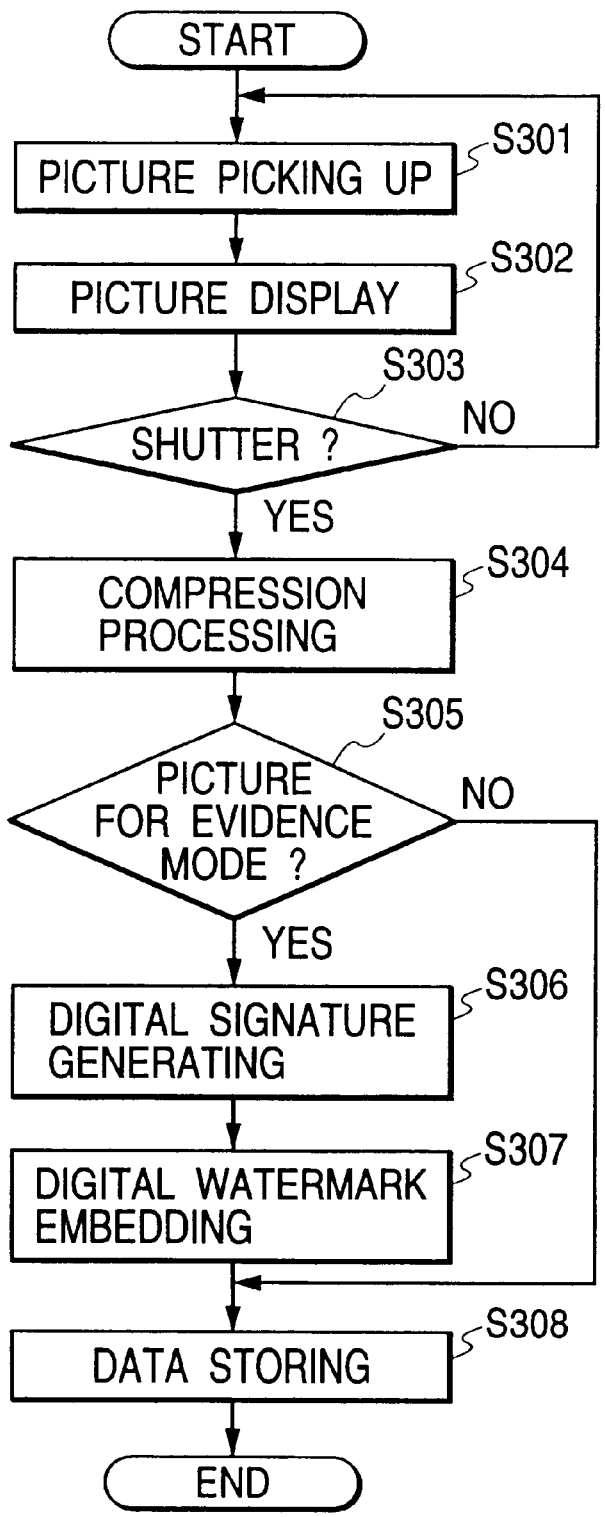
FIG. 9 is a flow chart for describing the image picking up operation of the digital camera shown in FIG. 8.

FIG. 9 is a flow chart for describing the operation for picking up an image of the digital camera shown in FIG. 8.

This flow is performed in the case that the operator accepted by the input unit 23 indicates the image pick-up mode to be selected as the operation mode.

First, the picture receiving unit 11 converts an optical image formed by the lens to an electric signal, converts the electric signal to a digital picture data, and sends it to the display unit 22 (step S301). The display unit 22 displays the picture according to the received digital picture data (step S302).

Next, the picture receiving unit 11 determines whether recording indication of the digital picture data has been entered by use of the input unit 23, that is, determines whether a shutter button has been pushed (step S303). If the button has been pushed, then the sequence proceeds to step S304, on the other hand if the button has not been pushed, then the sequence returns to step S301.

In step 304, the compressing unit 14 receives the digital picture data from the picture receiving unit 11, compresses the digital picture data according to a predetermined compression system, and supplies the compression result namely the compressed picture data to the digital signature generating unit 15.

The digital signature generating unit 15 determines whether the image pick-up mode selected by the operator by use of the input unit 23 is the picture for evidence mode (step S305). If the image pick-up mode is determined to be the picture for evidence mode, a digital signature of the compressed picture data received from the compressing unit 14 is generated (step S306), and the generated digital signature is supplied to the digital signature and related information embedding unit 13b together with the compressed picture data. Upon receiving, the digital signature and related information embedding unit 13b embeds the digital signature and the related information stored in the related information storing unit 12 on the compressed picture data by means of the digital watermarking technique (step S307). At that time, as described herein above, the digital signature and the related information are embedded so that the embedded digital signature and the related information are removed thoroughly from the compressed picture data. Then, the compressed picture data having the embedded digital signature and related information is supplied to the recording unit 17.

On the other hand, in step S305, if the image pick-up mode is determined not to be the picture for evidence mode, then the compressed picture data received from the compressing unit 14 is supplied to the recording unit 17 directly.

The recording unit 17 stores the compressed picture data received from the digital signature generating unit 15 or the digital signature and related information embedding unit 13b in the storage medium attached to the memory unit 16 (step S308). At that time, when the compressed picture data received from the digital signature and related information embedding unit 13b is stored, a flag for indicating that the compressed picture data has been picked up in the picture for evidence mode is added to the compressed picture data and the compressed picture data having the added flag is stored.

As the result, in the case that the picture for evidence mode is selected as the image pick-up mode, the digital image data obtained by picking up is compressed and the digital signature of the compressed picture data is generated. The related information on the digital picture data and the generated digital signature are embedded in the compressed picture data.

Figure 10:
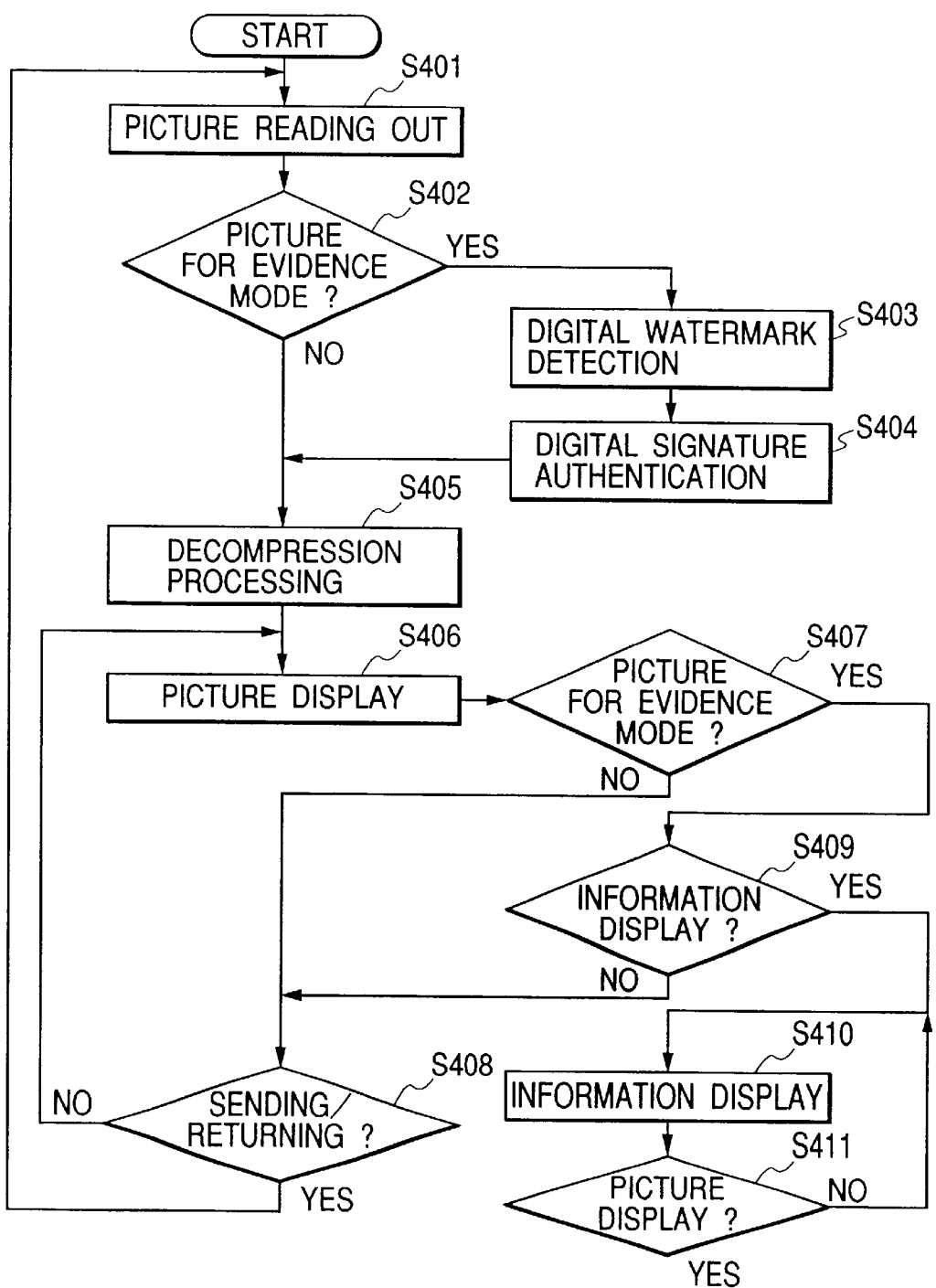
FIG. 10 is a flowchart for describing the picture playback operation of the digital camera shown in FIG. 8.

Next, the image playback operation of the digital camera to which the present invention is applied. FIG. 10 is a flow chart for describing the image playback operation of the digital camera shown in FIG. 8.

This flow is performed when the operator accepted by the input unit 23 indicates the playback mode to be selected as the operation mode.

First, the play-back unit 18 reads out the compressed picture data (the data recorded in the storage medium according to the flow shown in FIG. 9) from the storage medium attached to the memory unit 16 (step S401), and supplies it to the digital signature and related information getting unit 21a. If the flag for indicating that the compressed picture data has been picked up in the picture for evidence mode is added to the compressed picture data, the flag is also read out and supplied to the digital signature and related information getting unit 21a.

Next, the digital signature and related information getting unit 21a checks whether a flag is added to the compressed picture data received from the play-back unit 18 to thereby determine whether the compressed picture data has been picked up in the picture for evidence mode (step S402). If the compressed picture data has been picked up in the picture for evidence mode, a flag "1" for indicating the picture for evidence mode as shown exemplarily in FIG. 5(b) is stored in a predetermined area of the RAM 65 or the like shown in FIG. 3, and the sequence proceeds to step S403. On the other hand, if the compressed picture data has been picked up not in the picture for evidence mode, a flag "0" for indicating the ordinary mode is stored in a predetermined area of the RAM 65 or the like shown in FIG. 3, and the sequence proceeds to step S405.

In step S403, the digital signature and related information getting unit 21a extracts the compressed picture data so as to remove the digital signature and related information thoroughly from the compressed picture data received from the play-back unit 18 by means of the digital watermarking technique. Then, the compressed picture data is supplied to the digital signature authentication unit 19 together with the extracted digital signature. Upon receiving, the digital signature authentication unit 19 authenticates the compressed picture data by use of the digital signature (step S404) and the authentication result is stored. A flag which indicates whether the compressed picture data has been altered, for example shown exemplarily in FIG. 5(c), is stored in a predetermined area of the RAM 65 shown in FIG. 3.

In step S405, the decompressing unit 20 receives the compressed picture data, and decompresses it to obtain the digital picture data. The display unit 22 displays the picture in accordance with the digital picture data (step S406).

Next, the display unit 22 checks the flag generated in step S402 to thereby determine whether the digital picture data which is being displayed has been picked up in the picture for evidence mode (step S407) If the digital picture data has been picked up not in the picture for evidence mode, then the sequence proceeds to step S408, and whether the operator has entered sending/returning shift of the picture by use of the input unit 23 is determined. If sending/returning shift of the picture has been entered, then the sequence returns to step S401 to read out the compressed picture data specified by the indication from the storage medium of the memory unit 16. On the other hand, if sending/returning shift of the picture has not been entered, then the sequence returns to step S406.

In step S407, if the digital picture data which is being displayed is determined to be a digital picture data which has been picked up in the picture for evidence mode, the sequence proceeds to step S409, and whether the operator has entered display indication of the related information by use of the input unit 23 is determined. If the input indication of the related information has not been entered, then the sequence proceeds to step S408. On the other hand, if the input indication of the related information has been entered, then the related information on the digital picture data which is being displayed extracted by the digital signature and related information getting unit 21a is acquired, and the display content is switched from the digital picture data to the related information (step S410). At that time, the flag generated instep S404 is checked, and the authentication result of the digital signature (YES/NO of alteration) is also displayed. Then, the sequence proceeds to step S411.

In step S411, whether the operator has entered display indication of the picture by use of the input unit 23 is determined, if the display indication has been entered, then the sequence proceeds to step S406, the display content is switched from the related information to the picture in accordance with the digital picture data.

According to the present embodiment, the same effect as obtained by the first embodiment is obtained.

The present invention is by no means limited to the above-mentioned respective embodiments and various modifications are possible within the scope of the invention.

For example, in the above-mentioned embodiments, the case in which the related information is embedded and extracted and the digital signature is generated and authenticated automatically when the picture for evidence mode is selected is described, however otherwise the case in which whether the process to be performed is confirmed about embedding and extraction of the related information and generation and authentication of the digital signature respectively on the display unit 22 and the process that is indicated to be performed by use of the input unit 23 is performed may be applied. In embedding the related information, the information to be embedded may be specified dialogically with the operator through the display unit 22 and the input unit 23.

In the above-mentioned respective embodiments, the case in which the related information is embedded and extracted and the digital signature to the digital picture data is generated and authenticated by means of the digital watermarking technique is described, however otherwise the case in which any one of the processes is performed may be applied. According to the digital camera which is capable of embedding and extracting the related information by means of the digital watermarking technique, the reliability of the digital picture data as an evidence is improved, and according to the digital camera which is capable of generating and authenticating the digital signature to the digital picture data, the fraudulence such as alteration of the digital picture data is detected.

In the above-mentioned respective embodiments, the case in which the related information is extracted and the digital signature to the digital picture data is authenticated by means of the digital watermarking technique during image playback for the digital picture data picked up in the picture for evidence mode is described, however otherwise these functions may be omitted from the digital camera with preamble that these functions are performed by an information processing apparatus such as a personal computer.

As an example, an information processing apparatus for verifying the digital picture data picked up in the picture for evidence mode to be used for the digital camera shown in above-mentioned first and second embodiments is described.

Figure 11:
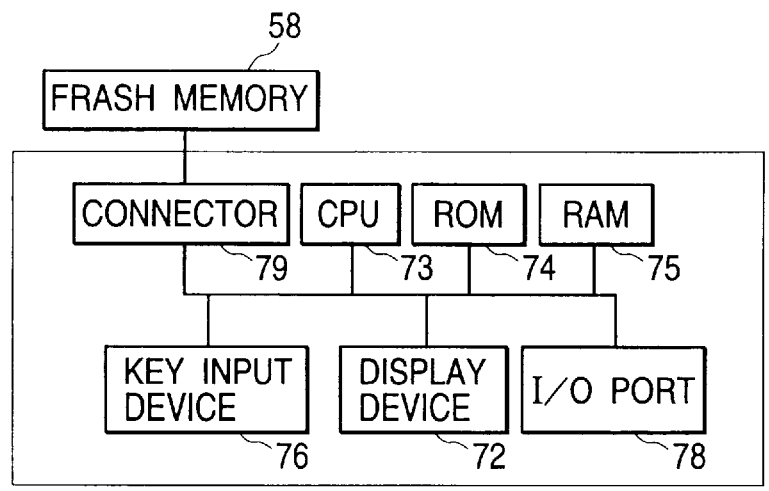
FIG. 11 is a block diagram for illustrating the hardware structure of an information processing apparatus for authentication of an digital picture data picked up in the picture for evidence mode by use of a digital camera shown in the first and second embodiments of the present invention.
Figure 12:
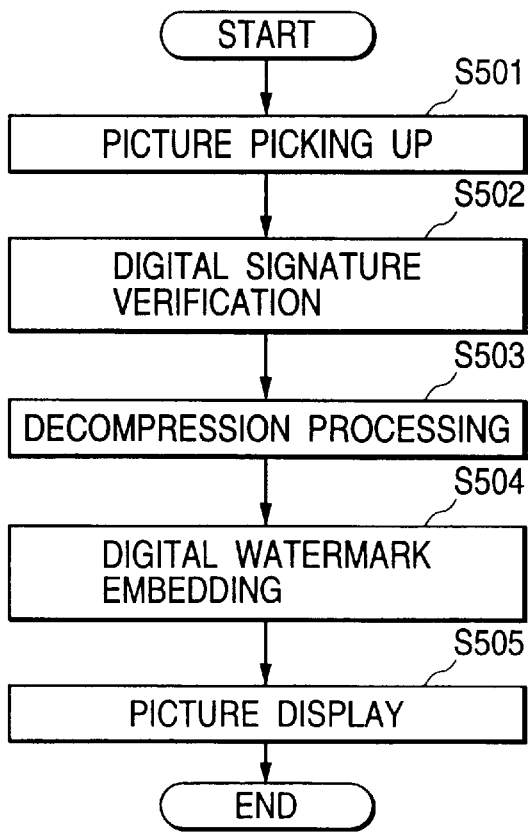
FIG. 12 is a flow chart for describing the operation performed when a digital picture data is authenticated by use of the information processing apparatus shown in FIG. 11.

FIG. 11 is a block diagram for illustrating the hardware structure of an information processing apparatus for verifying the digital picture data picked up in the picture for evidence mode by a digital camera shown in the first and second embodiments of the present invention, and FIG. 12 a flow chart for describing the operation of the information processing apparatus shown in FIG. 11 when the digital picture data is verified.

First, the compressed picture data is read in from the flash memory 58 connected through a connector 79 or the digital camera shown in FIG. 3 connected through an I/O port 78 in response to the indication of the CPU 73, and stored in the RAM 75 (step S401). A ROM 74 has stored various programs and the program is performed by the CPU 73 to control respective components shown in FIG. 11 integrally. The play-back unit 18, the digital signature authentication unit 19, the decompressing unit 20, and the related information getting unit 21 shown in FIG. 1 and FIG. 7 function their processes respectively. The ROM 74 may comprise a detachable storage medium such as a CD-ROM.

Next, the CPU 73 takes out a verification key (the public key which is paired with the private key (signature key) used when the digital signature has been generated) for verifying the digital signature from the ROM 74, verifies the digital signature added to the compressed picture data stored in the RAM 75, and stores the verification result in the RAM 75 (step S502).-

Next, the CPU 73 decompresses and restores the compressed picture data to the digital picture data and stores it in the RAM 75 (step S503). Then, the related information on the data embedded in the restored digital picture data is extracted and stored in the RAM 75 (step S504).

Next, the CPU 73 controls a display unit 72 to display any one of or combination of the picture in accordance with the restored digital picture data, the extracted related information, and the verification result of the digital signature according to the indication of the operator entered to a key input device 76 (step S505).

As the result, it is possible that the information processing apparatus verifies the digital picture data picked up in the picture for evidence mode by use of the digital camera shown in the above-mentioned first and second embodiments.

As described hereinbefore, according to the present invention, the digital camera which is capable of preventing alteration of the generated digital picture data and which is preferable for improvement of reliability as an evidence is provided.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A recording device for picking up an image and converting the image to digital picture data comprising:
    digital watermarking means for embedding related information on said digital picture data in said digital picture data by a digital watermarking technique; and
    storing means for storing said digital picture data in which said related information has been embedded,
    wherein said digital watermarking means divides said digital picture data into a plurality of areas, divides said related information on said digital picture data into a plurality of segments so that each segment corresponds to the respective areas of the plurality of said divided areas, embeds corresponding segments of said related information divided into the plurality of areas in the plurality of said areas respectively, and integrates the plurality of said areas in each of which said corresponding segment of said related information has been embedded to generate the digital picture data in which said related information has been embedded.

2. A recording device according to claim 1, further comprising:
    related information getting means for extracting said related information embedded in said digital picture data by the digital watermarking technique.

* * * * *